United States Patent

[11] 3,614,539

[72] Inventor Bennett Hallenbeck
 Tustin, Calif.
[21] Appl. No. 829,491
[22] Filed June 2, 1969
[45] Patented Oct. 19, 1971
[73] Assignee Sybron Corporation
 Rochester, N.Y.

[54] INTRINSICALLY SAFE SYSTEM INCLUDING ELECTRICAL BARRIER WITH EXTERNAL CONNECTORS
7 Claims, 8 Drawing Figs.

[52] U.S. Cl. ................................................. 317/99,
 317/100, 317/101 R
[51] Int. Cl. ................................................. H02b 1/10
[50] Field of Search ................................................. 
 317/99–101; 174/52.6; 307/92, 93

[56] References Cited
UNITED STATES PATENTS
2,737,579 3/1956 Wehrlin ........................ 317/101
2,963,577 12/1960 Errichiello .................... 317/101
3,106,665 10/1963 Byles ............................ 317/100
3,353,068 11/1967 Turk ............................. 317/99

OTHER REFERENCES
Presented to Parliament by the Minister of Labour, Annual Report of H.M. Chief Inspector of Factories, 1966, pp. 79–81, Her Majesty's Stationery Office, London, England Primary Examiner—Lewis H. Myers
Assistant Examiner—Gerald P. Tolin
Attorneys—Peter J. Young, Jr. and Joseph C. MacKenzie ABSTRACT: A system having a nonhazardous area and a hazardous area electrically intercommunicate via an electrical barrier. The barrier fails safe, limits both voltage and current, and consists essentially of a monolithic, nonrepairable, ground-bus-mounted circuit having a fuse and three resistors in series, and a pair of zener diodes which break down with excessive voltages at intermediate points of the series resistance.

INVENTOR.
BENNETT L. HALLENBECK

BY

ATTORNEY

INVENTOR.
BENNETT L. HALLENBECK
BY

ATTORNEY

INTRINSICALLY SAFE SYSTEM INCLUDING ELECTRICAL BARRIER WITH EXTERNAL CONNECTORS

The background of the invention is the concept of intrinsic safety. According to this concept, electrical apparatus, potentially dangerous to life, limb and/or property, is considered intrinsically safe, provided that under no reasonably foreseeable circumstances whatsoever can such apparatus produce electrical sparks, electrical overheating, excessive levels of voltage or current, human health or safety hazards, and the like. While intrinsic safety implies in some sense protection of the electrical apparatus as such, it is basically a matter of assuring that if electrical apparatus damage or failure does occur, for whatever reason, nothing worse will result. For instance, if the apparatus is mechanically damaged, and intrinsic safety prevails no sparks or overheating will occur such as might ignite an inflammable atmosphere contacting the apparatus.

The prior art teaches employing fuses, zener diodes, circuit breakers, current-limiting resistors, and so forth, to provide intrinsic safety, safeguard apparatus, and the like. The various combinations and configurations of such elements, as have been proposed heretofore, are too numerous to attempt to describe at length. A simple example, however, would be a series resistor and a zener diode. The resistor limits current and the diode voltage applied to some electrical device. If the voltage and current limits are such that the device can in no way whatsoever, and under no circumstance, produce a hazardous effect from electrical energy supplied to it via the resistor then the device is intrinsically safe. In effect, one is using the diode and resistor as a barrier preventing electrical energy from being applied to the device at dangerous or potentially dangerous levels.

In a system according to the present invention, electrical energy is conducted to a hazardous area via a fused resistor and diode circuit contained in an insulative envelope along with a metal heat sink, the heat sink providing diode support, the return path for the electrical current and the means for mounting the barrier on, and electrically connecting it to, a ground bus external to the envelope. The envelope is solidly filled with epoxy resin or like potting material. The envelope and its contents therefore form a rigid monolithic block that is substantially unrepairable, and provides a barrier that prevents electrical energy above a given level from passing therethrough.

Preferably, the resistor and diode circuit has several stages. Thus, a first zener diode diverts energy if the voltage across fuse and resistor becomes excessive. If the excess lasts a fraction of an instant the fuse will blow if the current is excessive. Without the diode, excess current could persist long enough to be dangerous, before the fuse blew. Further, a second resistor is connected to the first resistor to also carry the energy current, and a second zener diode diverts the energy if the voltage across the second resistor becomes excessive. Preferably, the diodes are chosen so that the second actually fires before the first. A third resistor, finally is connected to the second resistor and also carries the energy and limits this energy to a safe value.

In practice, it is found that this sort of electrical barrier permits freedom of choice and interconnections of all instruments and devices in the nonhazardous or safe area. For example, a barrier according to the invention can safeguard against a fault as high as 1,500 volts. The typical nonhazardous or safe area, however, is a control room complex in which rarely are encountered faults higher than 250 volts (R.M.S. or DC). On the other hand, equipment in the hazardous area is in general intrinsically safe provided the barrier is operative to limit the currents and voltages applied to the equipment in the hazardous area. Preferably, the barrier according to the invention provides the electrical interface between the safe and hazardous areas. The barrier of the present invention is practically foolproof, in contrast to explosionproof housings and like structural expedients, since it cannot be repaired and is more or less maintenance free.

Briefly described, FIG. 1 is an electrical diagram of the circuitry per se of a novel barrier according to the invention.

Figure 3:
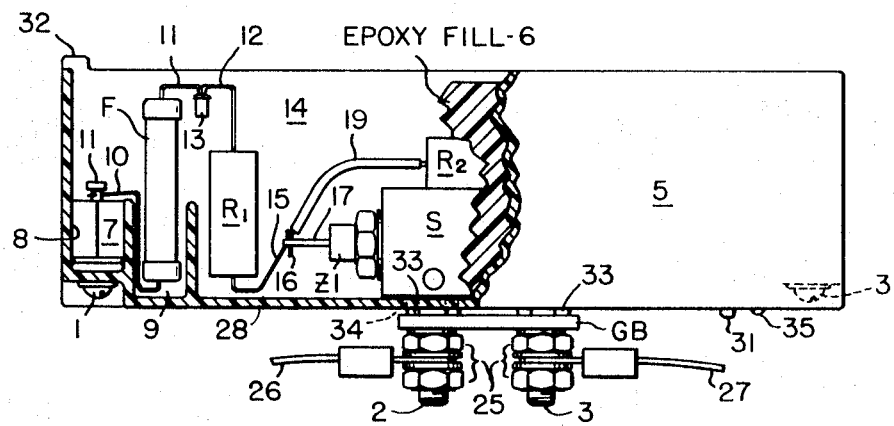
Figure 4:
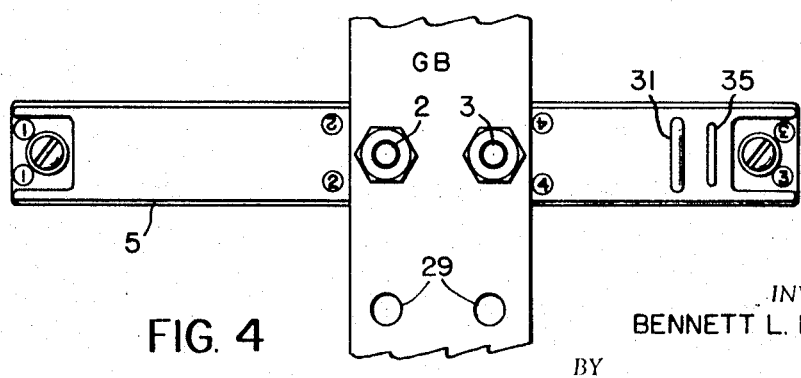
FIG. 4 is a bottom view of the actual barrier structure.
Figure 5:
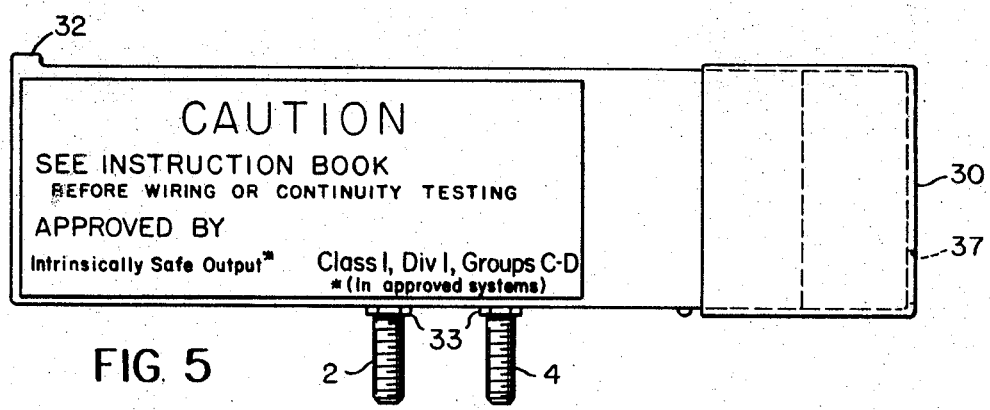
Figure 6:
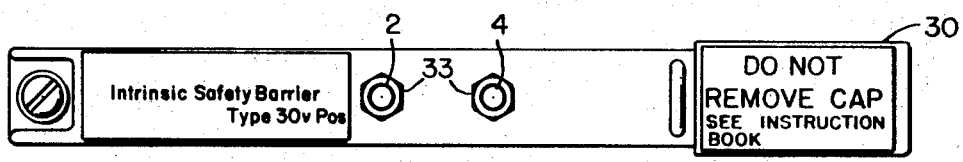
Figure 7:
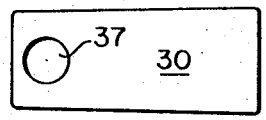

FIGS. 5 and 6 correspond to FIGS. 3 and 4 but show additional external detail, a portion of which is further illustrated in FIG. 7.

Figure 8:
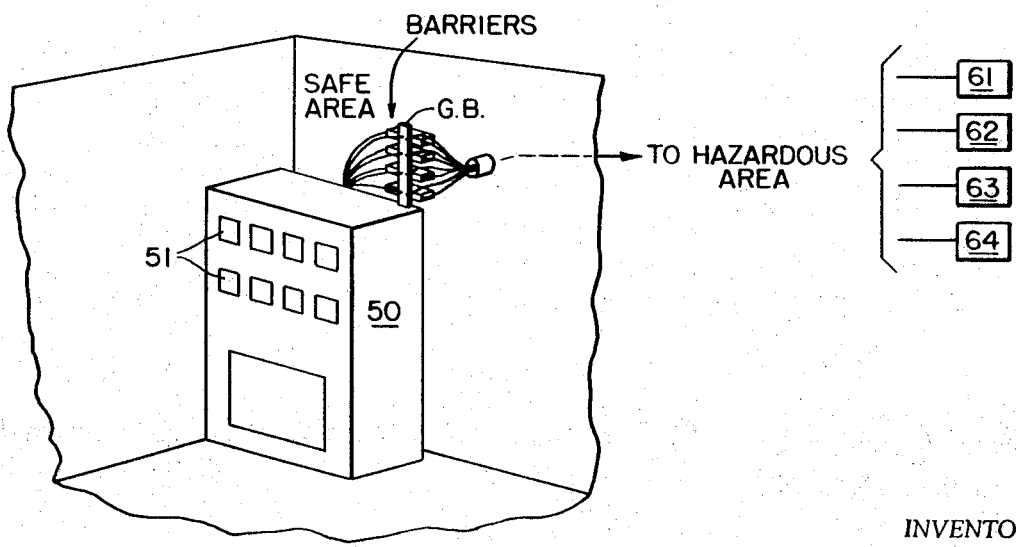

FIG. 8 is a schematic view of the invention in a typical use.

Figure 1:
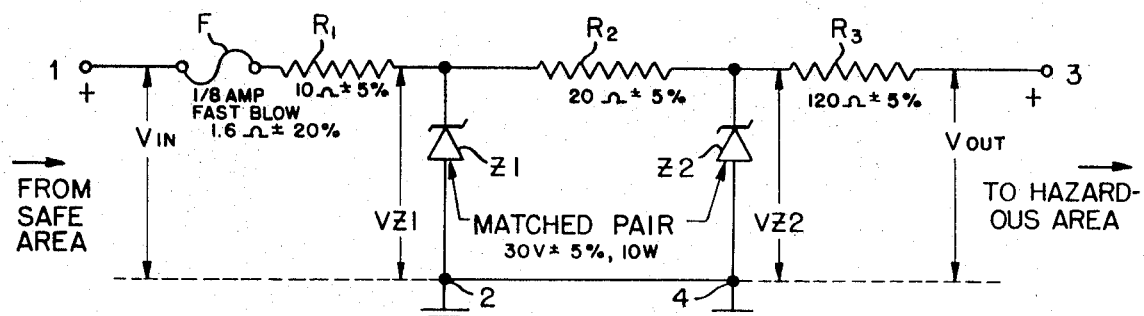

FIG. 1 shows the basic barrier circuit, including specific circuit values of a working embodiment. The diagram is entirely self-explanatory from this point of view except for the "matched pair" of diodes $Z_1$ and $Z_2$. Matching, in this case, means that the diodes are chosen so that the voltage required to fire $Z_1$ is about 1 to 1½ volts higher than the voltage needed to fire $Z_2$. In normal use, a source S of DC is connected to terminals 1 and 2 and a load L, essentially a resistance, is connected to terminals 3 and 4. As indicated in the drawing, connections to terminals 2 and 4 is via ground. This ground will normally be a ground bus maintaining all grounded points at the same ground potential. As shown, the system is a negative ground system but, with reversal of the diodes, would be a positive ground system, a mere matter of choice, for present purposes. Except for the indicated parts values, and the fuse F being distinct from resistor $R_1$, the circuit of FIG. 1 is old in the intrinsic safety barrier art.

In use, the electrical energy supplied by source S normally will not cause the current through fuse F to exceed its rated value, nor the voltage at the cathodes of the zener diodes to exceed diode-firing voltage.

The instrumentality including load L is in the hazardous area, and normal operation of the source and instrumentality is that the electrical energy at terminals 3 and 4 is below a level to which the instrumentality can respond by creating a spark of like dangerous effect, supposing the hazardous area to be one with an inflammable atmosphere, for example. Under these conditions, the instrumentality's electrical elements can be exposed to the inflammable atmosphere with absolute certainty that ignition will not occur by reason of abnormal operation of the apparatus.

In a typical case, in normal operation, the system resistance will be the source resistance, the same 150 ohms of the barrier circuit, and the load resistance in series, and load voltage and current will remain within safe limits.

However, it is essential to assure the integrity of the barrier in order to obtain the advantages of its electrical properties (more particularly described infra). In the present invention, the barrier is provided in monolithic form for making the barrier circuit essentially unrepairable and inaccessible, in order to foil human intervention, namely attempted maintenance and/or repair. For instance, if the barrier circuit were accessibly housed in, say, a plastic box with removable cover, and appeared to be defective, the user might be tempted to replace a defective component that had failed safe because of its intrinsic fail-safe character, with an electrical equivalent, not intrinsically fail-safe, as for example, a molded carbon composition resistor, a type of resistor which can too frequently fail short.

In the present invention, great precautions are taken to prevent maintenance or repair from being anything more than out-and-out replacement of the barrier. In essence, the electrical circuit is embedded in insulating material contained in a box, itself of insulating material, to provide a monolithic assemblage that is easy to fabricate, and, once fabricated, cannot, as a practical matter, be disassembled.

Figure 2:
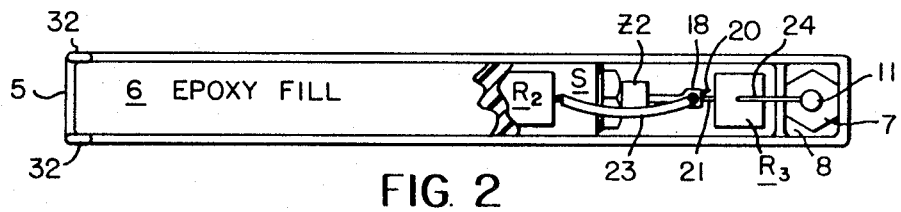
FIGS. 2 and 3 are plan and elevation views, partly in section.

Thus, FIG. 2 hereof shows that the safety circuit is housed in a box 5 and that this box is solidly filled with a suitably insulating potting material 6 preferably an epoxy resin. FIG. 2 is a top view looking down into the box through an open side that remains open except by virtue of the fill, the approximate level of which is indicated by the arrowhead of the reference numeral 6 in FIG. 2. It will be noted that the fill has been broken out of the right-hand end of the box as shown in FIG. 2 and out of the left-hand end of the box as shown in FIG. 3. Taken together, the two figures show all the contents and interior of the box, which are almost but not quite bilaterally symmetrical, the symmetry being spoiled by fuse F and the compartment therefor in the left side of box 5.

As will be seen from FIGS. 3 and 4, terminals 1 and 3 take the form of conventional screw and washer connectors for electrical connection, respectively, to equipment in the safe area, and equipment in the hazardous area. These connectors form parts of massive conductive metal hexagonal blocks 7 fitting snugly in compartments 8 of the box 5.

Fuse F fits relatively loosely and vertically in a compartment 9 next the left-hand compartment 8 (FIG. 2), and has a pigtail 10 soldered to a stud 11 forming part of left-hand block 7.

The other pigtail 11 of fuse F is crimped to pigtail 12 of $R_1$ by means of a sleeve 13, and hangs more or less loosely in vertical position in the main compartment 14 of box 5. Pigtail 15 of $R_1$, in turn is soldered with pigtail 16 of $R_2$ to terminal 17 of $Z_1$, which terminal has a hole (such as shown at 18 in the case of $Z_2$, FIG. 2) therein through which pigtails 15 and 16 pass.

Diode $Z_1$ is of the stud-mounted type wherein the mounting stud provides the second electrode as shown, and is shrunk into a solid rectangularly parapipedal brass block or heat sink S, and on the top of the sink S, rests $R_2$. Diode $Z_2$ is mounted like diode $Z_1$. As will be seen from FIG. 2, the resistors are square in cross section so one face of $R_2$ seats flush on the top face of block S. An insulating piece 16 of spaghetti covers the pigtail 16 of $R_2$, to obviate any possibility of the pigtail shorting to the sink S or the case of $Z_1$.

As will be seen from FIG. 2, the right-hand end of box 5 is quite like the left-hand end shown in FIG. 3, except that there is no fuse so there is also no compartment 9. Thus, there is the pigtail 20 of $R_2$ soldered together with pigtail 20 of $R_3$, both pigtails passing through the hole 18 of terminal 22 of $Z_2$ and being soldered thereto, and having a piece of spaghetti 23 on pigtail 20 to guard shorts to block S or the case of $Z_2$. The pigtail 24 of $R_3$ is, of course, soldered to stud 11 of the right handle terminal block 7.

As FIG. 3 shows, terminals 2 and 4 of FIG. 1 take the form of nut and lockwasher pairs 25 which accommodate in the usual fashion ground or common leads 26 and 27, respectively. Lead 27 is the current return from the hazardous area to the barrier, and lead 26 is the current return from the barrier to to the safe area. The bolts forming terminals 2 and 3 pass through the casing 5 and thread into the heat sink to which they make rigid conductive contact. Nuts 33 on terminals 2 and 3 pass freely through holes 34 in bottom 28.

As shown in FIGS. 3 and 5, the nuts 33 lock the terminals 2 and 3 to the sink S, and there is a gasket 34 under the sink S to seal between the bottom of sink S and the inner adjacent surface of bottom 28. Once the epoxy is hard, it supports the circuit and box 5 to the heat sink. When the barrier is fixed to bus G.B., the bus is clamped between nuts 33 and the innermost nuts 25. This mechanically isolates the box 5 from the bus bar, to permit powerful clamping forces to be applied by nuts 25 to the bus bar, thereby assuring good contacts to the bus bar without stressing the box 5 and its contents other than heat sink S. Bus G.B. is a flat bare, sturdy copper bar of any conventional longitudinal extent providing for a good low-ohm ground or common, as well as substantial support for the barrier. Thus, as FIG. 3 shows by means of the broken ends of bus G.B. and the pair of holes 29 various numbers of barriers can be clamped to the bus, like the barrier shown, but parallel thereto and spaced therefrom.

To assemble the barrier, one simply solders and otherwise assembles the circuit elements, the heat sing S and the block 7 together as shown, and in the illustrated configuration. This assemblage is more or less just dropped into the box 5. Block 7 and sink S are temporarily clamped in place, and then a more or less liquid solution of epoxy resin is filled into the remaining space. After the resin is hard, the temporary clamping is removed.

When this is done, nothing of the circuit is exposed except terminals 1 through 4, and when the resin hardens, one cannot get at the circuit without destroying the monolithic structure of connectors, circuit elements, box and fill. This is important in preventing tampering and ill-advised or unauthorized attempts at repair or service of the barrier. It cannot be stressed too much that the barrier should not be repaired except, perhaps, by what amounts to a rebuilding job performed by the manufacturer (through not feasible, due to the expense). It is to be noted that this animus against repair or tampering is dictated not only on engineering and manufacturing considerations, but also by the requirements of insurers of the installation affected by intrinsic safety. In this connection, it is to be observed that the barrier as shown in acceptable to insurers as fulfilling the requirements for intrinsic safety under the condition of use described herein.

FIGS. 5, 6 and 7 illustrate the externals of a typical commercial example. In FIG. 5, a prominent label defines, so to speak, the area of competence of the barrier and its criticality. In FIG. 6, a further label indicates its working voltage. The evident blank spaces on both labels provide for entering specific data as to specific instruction book, approving insurer, catalog number, and the like, all of which would usually be printed on the lable (though omitted here).

The hazardous end of the barrier is at the terminal 1, which, as can be seen from FIG. 4, is marked 1 adjacent terminal 1. Likewise, as to terminal 2, terminals 3 and 4. Terminals 1 and 3 are recessed into the box 5. This provides for an end cover 30, having a hole 37 therein, intended to cover the right-hand end of the casing 5 with the hole 37 registering with the recess-containing terminal 3.

As will be seen from FIGS. 7 and 8, the casing and cover are slightly trapezoidal, in order to assure that cover 30 only fits when the hole 37 registers with terminal 3. Bottom 28 of box 5 has two ridges 31 and 35 therein. Ridge 31 projects far enough to prevent cover 30 from being forced so far on the box 5 as to crack the plastic cover 30. Ridge 35 is enough slighter to bring about force fit of cover 30 to casing 5, but not so much as to crack cover 30. Preferably a slight ridge (not shown) is located in the inside of cover 30 that has to be forced past ridge 35 to provide a positive lock against coming off the casing 5.

As shown in FIG. 6, a suitable label is applied to cover 30 to warn the user not to remove the cover without finding out whether it is appropriate to do so or not. The location of hole 37 is to avoid having a bend of wire lead between cover and the end of casing 5. Further, as FIGS. 2, 3 and 5 show, cover 30 cannot be put on wrong due to the interferring projections 32 of the "dangerous" end of the barrier.

Looking at the barrier overall, the hazardous end is at terminal 1. That is, it is this terminal that is to be kept out of the hazardous area. The end at cover 30, however, is the safe end, the one which can be located in the hazardous area. While terminals 2 and 4 are in effect neutral, any short from terminal 3 to ground could be hazardous, unless the location of the short is outside the hazardous area. Hence, the cover 30 and of course, the insulation which would be on the lead going from terminal 3 into the hazardous area, protect the safe end of the barrier from contact with the dangerous elements of the safe environment. In any event, the best location for the barrier is just at the edge of the safe area, at a point where there is the least likelihood of some unsafe connection to terminal 3.

In operation, normally the barrier is merely a series resistance. As long as it thus operates, the user would have no concern with it beyond, say, inspecting to see that its external connections are in order, cap 30 is on, and the like. Abnormally, however, the electrical energy at terminals 1 and 2 will exceed safety limits.

The barrier circuit is designed to maintain safety limits long enough for the fuse to blow. It is further designed to do this even with failure of one or another of its components. The resistors $R_1$, $R_2$ and $R_3$ are wire-wound resistors which can only fail-safe, that is by open-circuiting. If a resistor burns out, source S is simply disconnected from load L, automatically.

The diodes $Z_1$ and $Z_2$ are of a type that fail almost invariably by short circuiting. Thus, 1N2989B Zener diodes fail almost invariably by open circuiting. Diodes of this specific type, and other types also having this "fail-safe" property are routinely available from various manufacturers. As will be seen later, both diodes must fail simultaneously to defect the purpose of the circuit, which means that barrier failure due to diode failure has a probability of about 1 in millions.

The fuse F is the weakest link. Compared to the time it takes a diode to fire in response to voltage at a firing level, the fuse F (despite being preferably a so-called "fast-blow" type) takes a relatively long time to blow out. Further, the normal current rating of the fuse is by no means a reliable index of how much current it will stand, without blowing out. However, the diode/resistor arrangement assures that the fuse blows before the energy available at terminals 3 and 4 reaches a dangerous level.

Any dangerous level of electrical energy applied to terminals 1 and 2 will increase the voltages across the diodes. The difference between the firing voltages of the diodes assures that the first diode to fire will be diode $Z_2$. When $Z_2$ fires, this immediately increases the level of current through fuse F. This increase is due to the fact that $Z_2$, firing, provides a low resistance shunt to ground across $R_3$ and the load resistance in series, each of which is large compared to the resistance to ground via the firing diode. Ordinarily, fuse F will bow while $Z_2$ regulates the voltage across it to its firing voltage and shunts current to ground.

However, it is just possible that fuse F will not blow, and indeed will be able to sustain enough current that $Z_2$ becomes overdriven. If $Z_2$ is overdriven, its regulating and shunting abilities saturate. Now, the voltage across it can rise substantially above its rated voltage, and more energy could be applied to the load, possibly at a dangerous level.

However, if fuse F does not blow and the voltage across $Z_2$ begins to rise, $Z_1$ fires before the voltage across $Z_2$ exceeds a safe value. $Z_1$ firing decreases the resistance seen by source A still further, causing a further increase in current through fuse F. Furthermore, $Z_1$ firing allows $Z_2$ to regulate normally, since $Z_1$ is shunting current to ground, and can indeed be overdriven, while $Z_2$ continues to regulate in normal zener fashion. Finally, as long as both zeners do not simultaneously fail by open circuiting, the worst that can happen is that a diode fails by becoming a short circuit, thereby dropping the voltage across terminals 3 and 4 to substantially zero and burning out fuse F while diverting substantially all current from the load until the fuse blows.

It will be observed that the above sequence of events, if it occurred, would occur in much less time than it takes to describe it.

It will be seen, therefore, that it is impossible that the barrier circuit be in any but one or the other of two states, one being that of a conductor having some 150-ohms resistance between terminals 1 and 3, and the other being that of a conductor open circuited between terminals 1 and 3.

Once in use, the barrier becomes in effect just another connector, or, more precisely, just another fuse. However, it can be tested, nondestructively, to determine its state of operativeness relatively completely. Thus, if the barrier circuit is built according to FIG. 1, the resistance between terminals 1 and 3 would be measured. If the resistance from terminals 1 to 3 is other than 151.6 ohms ±5 percent, plus 0.26 percent per °C. referred to 25°C., the barrier should be rejected as suspect.

Further test would be to drive the barrier circuit of FIG. 1 with a current source at 100 ma. DC with terminals 3 and 4 disconnected. That is to say, the voltage across terminals 1 and 2 would be sufficient to fire both diodes, without, however, blowing the fuse F, in this case the following "Fault" table applies:

| Fault | D.C. voltage across terminals 3 and 4 | D.C. voltage across terminals 1 and 3 |
| --- | --- | --- |
| None | 28.50 to 30.25 | 2.41 ±0.38 |
| $Z_1$ open/missing | 28.50 to 30.25 | 3.16 ±0.18 |
| $Z_2$ open/missing | 29.50 to 31.50 | 1.16 ±0.08 |
| $Z_1$ & $Z_2$ interchanged | 28.50 to 30.25 | 1.16 ±0.08 |
| $Z_1$, $Z_2$ open/missing | About supply voltage | About zero |
| $Z_1$ and/or $Z_2$ shorted and/or reversed | 0 to 0.7 typical | irrelevant |

Measurements should be made, of course, with a voltmeter of the indicated accuracy, and having at least 1-megohm input resistance.

When a diode fires, the load sees what appears to be a 30-volt battery in series with 120 ohms, during such time as the fuse manages to stay open. This characteristic allows the transmission line into the hazardous area to be calculated for the worst case. The worst case, of course, is when the transmission line impedance is equal to the barrier output impedance. Hence, the amount of energy that can be delivered to the load can be decreased simply by suitable mismatch to the barrier. It is further to be noted that by increasing the sum of fuse resistance, $R_1$, $R_2$ and $R_3$ to 300 ohms, the circuit of FIG. 1 provides intrinsic safety for instrumentation in a hydrogen atmosphere. Series resistance, however, has also to be chosen with regard to the load. The some 150 ohms exemplifies a value suitable for nominal 24-volt instrumentation in common use today. Diode leakage, incidentally, in the circuit of FIG. 1 has insignificant effect on accuracy of transmission.

With a barrier of the form shown in FIG. 1, a reliable estimate of the probability of hazardous failure in a typical system is on the order of one in a million, million, million. This order of reliability is literally astronomical. As an illustrative analogy, one might expect an automobile in good condition to go 40 miles without failure, based on the reliability of typical automobiles, whereas a vehicle having a reliability corresponding to that of the barrier according to the invention could make several round trips from earth to sun; with less expectation of a single failure occurring during the whole series of round trips.

The reliability of the barrier according to the invention has been recognized by industrial insurers, to the extent that the barrier according to the invention is approved by Class I, Division I, Groups C and D use. Class I, for example, includes gaseous environments wherein inflammable atmospheres including ethyl ether, ethylene, and cyclopropane can normally or occasionally provide the inflammable part of the atmosphere. For instance, surgical installations are likely to be Class I, Division I or II, Group C environments. The difference between Divisions I and II is that the former can be normally hazardous whereas the latter is not ordinarily hazardous. Incidentally, the above ratings are conservative. There are not to be taken as limiting. Their importance is that insurers and like safety-concerned entities have officially granted such ratings. As pointed out previously, the barrier can be modified to make hydrogen atmospheres safe, as so-called class B hazard, through this at this time has not been sanctioned by authority.

FIG. 8 shows a typical installation wherein the safe area is a control room, or the like, containing a control cabinet 50, wherein various equipment 51 is to be connected to entities 61 to 64 in the hazardous area. A ground bus G.B. having four barriers thereon is shown at the top of the cabinet 50. At the right ends of the barriers, wires lead out to the hazardous area through the room wall. At the left ends of the barrier, wires go to equipment in the control cabinet. Bus B.G., of course, has a good ground connection (not shown).

The safe area control cabinet 50 will normally contain various electrically operated process indicators, controllers, and power supplies, AC mains outlets, electrical computers or output terminals thereof, and the like. The hazardous area, on the other hand, will contain various process equipment, and electrical measuring and controlling devices which are electrically coupled by the barriers to the aforesaid electrical equipment. If the hazardous area contains inflammable material, the electrical entities can be safely exposed to the inflammable material, provided that these entities can be prevented from producing heat or sparks capable of ignition. The barrier performs this function and hence obviates such expedients as explosion-proof housing, and the like structural artifices by means of which it is sometimes attempted to allow dangerous electrical phenomena to arise safely in hazardous areas by structurally isolating them. These structural artifices are cumbersome, and great care must be taken to keep them in working order since failure is readily overlooked. For instance, malfitting of the cover of an explosionproof instrument housing, easily overlooked, can leave a flame-propagating path between electrical equipment within the housing and an external flammable atmosphere. That is to say, structural explosionproofing is not "intrinsically safe." The instrument within the housing may be perfectly harmless in normal operation, that is when its current and/or voltage levels remain those it was designed for. The housing, however, cannot prevent these levels from being exceeded in consequence of mishaps, or malfunctions external to the hazardous area.

The barrier according to the invention, on the other hand, allows no dangerous voltage or current levels to be introduced into the hazardous area in the first place, hence, it is perfectly safe to allow the flammable atmosphere to contact the electrical equipment (connected to electrical barriers according to the invention) in the hazardous area.

The barrier illustrated herein is substantially exactly in accordance with a commercial example of the invention. The parts of the circuit are all routinely available from various manufacturers' stocks, and in assembling the circuit, the only selective step is to choose the diodes such that the zener voltage of diode $Z_1$ exceeds that of $Z_2$ by about a volt.

Certain economies can be practiced with the illustrated structure, but with results degrading to the intrinsic safety character. For instance, first sight suggests that it is really most uneconomical to discard a barrier because of the failure of fuse F (typical cost, 12 cents). Unfortunately, if users can get access to the fuse for replacement with the wrong fuse, or even something that is not a fuse at all. This sort of thing is potentially very dangerous. From one point of view, the whole point of the barrier is to make sure that a *correctly chosen* fuse flows in time enough to keep dangerous levels of electrical energy from arising in the hazardous areas. Since the purpose of the barrier is likely to be to prevent blowing up thousands of dollars of equipment, or worse, both practice and theory demand that the barrier be out-and-out replaced after it has done its job but once.

Nonetheless, certain modifications are possible. $R_3$, for example, is a precision resistor which together with $Z_2$ precisely define a DC source of given properties, with respect to the load into which it works. This load will include transmission line and an instrument with known capacitive and inductive properties. Knowing the source properties precisely allow one to determine the worse case, namely, that amount of transmission line, etc., into which the source can transfer energy with optimum efficiency. This allows source impedance and load impedance to be mismatched, as by lengthening, or shortening transmission line, enough to prevent occurrence of the worst case should this worst case happen to be borderline insofar as intrinsic safety is concerned. On the other hand, $R_3$ is essentially also part of the load, and in some cases could be structurally such.

Again, $R_1$ and F are essentially one resistance, but as a matter of availability it is usually more practical to have them as separable entities. Again, terminals 1 and 2 are driven by a battery or generator of some sort, and of course $Z_1$ cannot distinguish among generator impedance, fuse F and resistor $R_1$, so in a rare case these three entities could be lumped into one.

Zener diodes are not the only kinds of breakdown devices available, but are recommended due to ready availability of a wide spectrum of properties, manufacturers, etc. of zener diodes. For solid-state, low-voltage systems, which are contemplated here, zener diodes are ideal.

Having set forth my invention in accordance with USC 35 112, I claim:

1. An intrinsic safety barrier comprising a box, a first externally accessible electrical connector means in the external surface of said box, and a second externally accessible electrical connector means in the external surface of said box, the locations of said connector means being separated one from the other by external surface of said box; current-limiting and voltage-limiting circuitry contained within said box and interconnecting said connector means with each other; and potting means nonrepairably enveloping and potting said circuitry in said box said box having an open face and compartments therein opening toward said open face, components of said circuitry being in said compartments, said potting means filling said box substantially to said open face.

2. An intrinsic safety barrier comprising a box, a first externally accessible electrical connector means in the external surface of said box, and a second externally accessible electrical connector means in the external surface of said box, the locations of said connector means being separated one from the other by external surface of said box; current-limiting and voltage-limiting circuitry contained within said box and interconnecting said connector means with each other; potting means nonrepairably enveloping and potting said circuitry in said box and a supporting block in said box, said block mounting components of said circuit and being secured to said box by said potting means.

3. An electrical barrier system comprising a first resistor, a second resistor, a third resistor, a first diode, and a second diode; said first resistor having one end connected to one end of said second resistor, and to one electrode of said first diode, said third resistor having one end connected to the other end of second resistor and to one electrode of said second diode, each said one electrode being like the other said one electrode, said system further comprising a source of electrical energy and a load device, a first DC conductor, a second DC conductor and a third DC conductor, said source having a first terminal connected to said first DC conductor, said load device having a first terminal connected to said first DC conductor, and the other electrodes of said diodes being connected to said first DC conductor, said source having a second terminal connected to the other end of said first resistor via said second DC conductor, said load device having a second terminal connected to the other end of said third resistor via said third DC conductor; said source having its internal impedance effectively connected between its said terminals, and said load device having its internal impedance connected between its said terminals, and the relative polarity of said source and said diodes being such that said diodes do not conduct except with the voltage thereacross due to said source exceeding their breakdown voltages; said second conductor having as part thereof a fuse through which all the current between said first terminals flows; said barrier system including a box containing said resistors and said diodes, and potting means nonrepairably enveloping and potting said resistors and diodes in said box; said box having a first portion of said third conductor projecting thereinto for connection to said other end of said third resistor, said first portion being an electrical connector recessed into the external surface of said box; said conductor having a second portion fixed to said connector passing therefrom in the form of an insulated wire to the remainder of said conductor; said box having a cap fitted thereon, said cap having an aperture therein, and fastening means fastening said cap to said box with said aperture registering with said electrical connector and having said wire passing therethrough.

4. An intrinsic safety barrier comprising a box, a first externally accessible electrical connector means in the external surface of said box, and a second externally accessible electrical connector means in the external surface of said box, the locations of said connector means being separated one from the other by external surface of said box; current-limiting and voltage-limiting circuitry contained within said box and interconnecting said connector means with each other; potting means nonrepairably enveloping and potting said circuitry in said box, and a cap fitted to said box and covering said one said electrical connector means and having an aperture therein registering with said one said connector means.

5. An intrinsic safety barrier comprising a box, a first externally accessible electrical connector means in the external surface of said box, and a second externally accessible electrical connector means in the external surface of said box, the locations of said connector means being separated one from the other by external surface of said box; current-limiting and voltage-limiting circuitry contained within said box and interconnecting said connector means with each other; potting means nonrepairably enveloping and potting said circuitry in said box, and a supporting block, said block mounting components of said circuit and being secured to said box by said potting means, said block having mounting means fixed thereto for mounting said box, said mounting means being located externally of said box.

6. An intrinsic safety barrier comprising a box, a first externally accessible electrical connector means in the external surface of said box, and a second externally accessible electrical connector means in the external surface of said box, the locations of said connector means being separated one from the other by external surface of said box; current-limiting and voltage-limiting circuitry contained within said box and interconnecting said connector means with each other; potting means nonrepairably enveloping and potting said circuitry in said box, a supporting block, said block mounting components of said circuit and being secured to said box by said potting means, and third externally accessible electrical connector means in the external surface of said box and separated from the two previously said connector means by external surface of said box, said third connector means being conductively fixed to said block, said block being made of conductive material conductively connected to said circuit.

7. The barrier of claim 6, wherein said third electrical connector means provides mounting means externally of said box for mounting said box.